US007265471B2

(12) United States Patent
Sprain

(10) Patent No.: US 7,265,471 B2
(45) Date of Patent: Sep. 4, 2007

(54) APPARATUS AND PROCESS FOR GENERATING ENERGY

(75) Inventor: Harry Paul Sprain, Atlanta, GA (US)

(73) Assignee: M International, LLC, Tucker, GA (US)

( * ) Notice: Subject to any disclaimer, the term of this patent is extended or adjusted under 35 U.S.C. 154(b) by 0 days.

(21) Appl. No.: 11/245,634

(22) Filed: Oct. 7, 2005

(65) Prior Publication Data

US 2006/0028080 A1   Feb. 9, 2006

Related U.S. Application Data

(62) Division of application No. 10/289,523, filed on Nov. 6, 2002, now Pat. No. 6,954,019.

(60) Provisional application No. 60/338,994, filed on Nov. 13, 2001.

(51) Int. Cl.
*H02K 1/00* (2006.01)
(52) U.S. Cl. ........................ 310/181; 310/152
(58) Field of Classification Search ................ 310/181, 310/152, 153, 154.01, 154.02, 154.28, 154.29, 310/268
See application file for complete search history.

(56) References Cited

U.S. PATENT DOCUMENTS

| | | | | |
|---|---|---|---|---|
| 2,553,298 A * | 5/1951 | Brunelle et al. | ....... | 310/154.02 |
| 2,669,670 A * | 2/1954 | Eggers | ........................ | 310/168 |
| 2,864,018 A * | 12/1958 | Aeschmann | ................ | 310/163 |
| 3,263,796 A * | 8/1966 | Parke | ........................ | 198/619 |
| 4,074,153 A * | 2/1978 | Baker et al. | ................... | 310/12 |
| 4,215,330 A * | 7/1980 | Hartman | ...................... | 335/306 |
| 4,562,399 A * | 12/1985 | Fisher | ........................ | 322/94 |
| 4,571,528 A | 2/1986 | McGee et al. | | |
| 4,728,833 A * | 3/1988 | Shiraki et al. | ............ | 310/68 R |
| 4,758,756 A * | 7/1988 | Pouillange | ................. | 310/152 |
| 4,843,268 A * | 6/1989 | Hovorka | ..................... | 310/181 |
| 4,972,112 A * | 11/1990 | Kim | ........................... | 310/181 |
| 5,105,139 A * | 4/1992 | Lissack | ...................... | 318/626 |
| 5,219,034 A * | 6/1993 | Wortham | ................... | 180/65.3 |
| 5,444,369 A * | 8/1995 | Luetzow | .................. | 324/207.2 |
| 5,585,680 A * | 12/1996 | Tsoffka | ........................ | 310/49 R |
| 5,677,583 A * | 10/1997 | Kawai | ......................... | 310/80 |
| 6,031,651 A * | 2/2000 | Nakasugi | ..................... | 359/200 |
| 6,049,146 A * | 4/2000 | Takara | .......................... | 310/24 |
| 6,262,508 B1 * | 7/2001 | Shibayama et al. | ......... | 310/181 |
| 6,271,614 B1 * | 8/2001 | Arnold | ........................ | 310/233 |

FOREIGN PATENT DOCUMENTS

DE    27 06 691    8/1978
JP    60167675    8/1985

OTHER PUBLICATIONS

David Scott, "Magnetic 'Wankel' for Electric Cars", Popular Science, Jun. 1979, pp. 80-81.*
David Scott, "Magnetic 'Wankel' for Electric Cars", Popular Science Magazine, Jun. 1979, pp. 80-81.

* cited by examiner

*Primary Examiner*—Dang Le
(74) *Attorney, Agent, or Firm*—Baker, Donelson, Bearman, Caldwell & Berkowitz PC

(57) ABSTRACT

Energy is generated by an apparatus and process which utilize magnetic forces to move a rotor in a circular direction to turn a rotor shaft. This apparatus and process convert magnetic energy into mechanical force or electrical energy.

3 Claims, 2 Drawing Sheets

APPARATUS AND PROCESS FOR GENERATING ENERGY

This application is a division of U.S. patent application Ser. No. 10/289,523 filed Nov. 6, 2002 now U.S. Pat. No 6,954,019 which, in turn, claims the benefit of U.S. Provisional Application Ser. No. 60/338,994, filed Nov. 13, 2001.

TECHNICAL FIELD

The present invention relates to the generation of energy. In a more specific aspect, this invention relates to an apparatus for generating energy. This invention also relates to a process for generating energy.

In this application, the term "energy" will be understood to refer to the capacity for doing work, whether directly as in a direct drive assembly or indirectly as in a stored condition. Additionally, in this application, the term "generating energy" will be understood to refer to the conversion or use of magnetic energy to generate mechanical force and the conversion of magnetic energy into other forms of energy including electrical or kinetic energy.

In this application, the term "electromagnet" refers to any device which is capable of creating a magnetic field through the application of electrical energy.

BACKGROUND OF THE INVENTION

There are numerous disclosures in the prior art of various apparatus and processes to generate energy. Examples of sources of energy include nuclear, petroleum, air, heat, water, etc.

Energy can be used in a multitude of ways, such as automotive and other engines, mechanisms for opening and closing, systems for moving objects from one place or position to another, etc. As energy is a valuable and required commodity for today's world, many attempts have been made to generate energy in an efficient and cost effective process.

With specific regard to engines, Wortham U.S. Pat. No. 5,219,034 (1993) discloses a vehicle powered by a magnetic engine which includes a block fitted with multiple cylinders for receiving magnetic pistons attached to a crankshaft and electromagnets mounted in the engine head for magnetically operating the magnetic pistons by electric current reversal.

Luetzow U.S. Pat. No. 5,444,369 (1995) discloses a sensor that produces a linear output signal in detecting the rotational positions of a throttle valve in an internal combustion engine.

Takara U.S. Pat. No. 6,049,146 (2000) discloses an electromagnetic piston engine capable of producing driving power by a reciprocal movement of a piston in a cylinder by electromagnetic force.

Although many apparatus and processes have been developed to generate energy for specific applications, there continues to be a need in this industry for an effective, inexpensive and reliable apparatus and process for generating energy.

SUMMARY OF THE INVENTION

Briefly described, the present invention provides an apparatus for generating energy by effective, inexpensive and reliable means. The energy generated by this invention can be used in many applications.

The present invention also provides an effective and reliable process for the generation (i.e., production) of energy.

Accordingly, an object of this invention is the generation of energy.

Another object of this invention is the generation of energy which can be used directly.

Another object of this invention is the generation of energy which can be used indirectly.

Another object of this invention is to provide an apparatus for generating energy.

Another object of this invention is to provide an apparatus for use as an engine or motor.

Another object of this invention is to provide an apparatus for use as a rotary engine.

Another object of this invention is to provide an apparatus which generates a long term supply of energy.

Another object of this invention is to provide an apparatus which is compatible with various forms of engines and motors, such as battery and solar powered engines and motors.

Another object of this invention is to provide an apparatus in which magnetic fields can be harnessed in an efficient manner.

Another object of this invention is to provide an apparatus in which magnetic fields can be harnessed in an efficient manner to produce lateral force.

Another object of this invention is to provide an apparatus which converts stored energy into kinetic energy.

Still another object of this invention is to provide a process for generating energy.

Still another object of this invention is to provide a process which can be used in an engine or motor.

Still another object of this invention is to provide a process which can be used in a rotary engine.

Still another object of this invention is to provide a process which generates a long term supply of energy.

Still another object of this invention is to provide a process which can be used in various forms of engines and motors, such as battery and solar powered engines and motors.

Still another object of this invention is to provide a process in which magnetic fields can be harnessed in an efficient manner.

Still another object of this invention is to provide a process in which magnetic fields can be harnessed in an efficient manner to produce lateral force.

Still another object of this invention is to provide a process for converting stored energy into kinetic energy.

These and other objects, features and advantages of this invention will become apparent from the following detailed description.

DETAILED DESCRIPTION OF THE INVENTION

The present invention relates to an apparatus for generating (that is, producing) energy. More specifically, the apparatus of this invention comprises:

A. a rotor movable in a clockwise or counterclockwise direction and having at least one magnet affixed to the rotor;

B. a plate located adjacent to but spaced apart from the rotor;

C. one or more magnets affixed to and around an upper side of the plate and having a polarity which is opposite to the magnet affixed to the rotor;

D. a magnetic field of increasing magnetic field strength which is provided by the one or more magnets affixed to the plate, wherein the magnetic field is continuous except for a defined space;

E. an electromagnet capable of creating a magnetic field and located adjacent to but not within the defined space, wherein the device is in sequence with movement of a magnet affixed to the rotor.

This invention also provides a process for generating energy in which the process uses an apparatus as described in the preceding paragraph.

Figure 1:
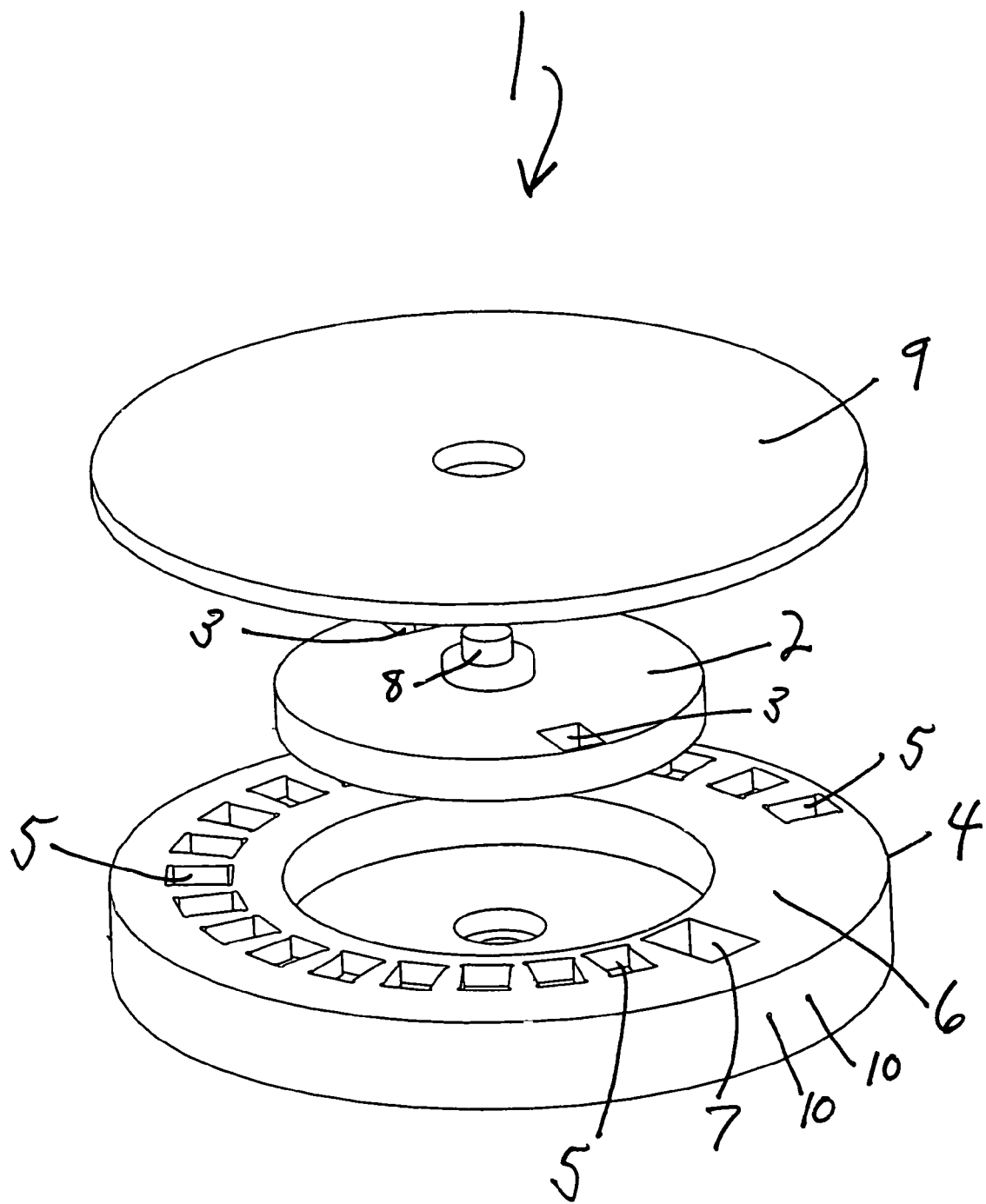
FIG. 1 is a view of the apparatus of this invention, shown in an exploded form.

A preferred configuration of the apparatus of the present invention is shown in exploded form in FIG. 1.

Referring now to the drawings, in which like numbers represent like elements, FIG. 1 shows an exploded view of a preferred embodiment of this invention in which an apparatus 1 comprises a movable rotor 2 having magnets 3 affixed to an upper side of the rotor 2. In FIG. 1, there are two magnets 3 affixed to the upper side of the rotor 2. The apparatus 1 includes a plate 4 which is located adjacent to (i.e., in close proximity) but spaced apart from the rotor 2.

Affixed to and around an upper side of the circular plate 4 is a series of magnets 5. As shown in FIG. 1, the series of magnets 5 is approximately sixteen in number. The magnets 5 have an opposite polarity to that of the magnets 3 located on the rotor 2. The magnets 5 are located in a generally circular fashion around the plate 4. However, each magnet 5 is located at a generally increasing distance from the inner edge of the plate 4, viewed in a clockwise direction.

The location of magnets 5 creates a magnetic field of increasing magnetic field strength around the plate 4 except for a defined space 6 where the first magnet 5 of the series is not adjacent to the last magnet 5. The area between the first and last magnets defines space 6.

As shown in FIG. 1, an electromagnet 7 is located adjacent to but not within defined space 6. The electromagnet 7 is equipped to create a magnetic field which will be of a polarity which is the same as the polarity of the magnets 3 and opposite to the polarity of the magnets 5.

In operation and with reference to FIG. 1, the rotor 2 moves through the magnetic field created by the magnets 5 in a counter clockwise direction due to the opposite polarities of the magnets 3 and 5. However, the space 6 defines a break or alteration in the magnetic field and, in the absence of electromagnet 7, the rotor 2 would stop rather than move through space 6. At or around the point when the rotor 2 would stop, the electromagnet 7 creates a magnetic field of opposite polarity to the magnet 5. This field cancels out the field created by magnet 5 and sends or allows the passage of magnet 3 through and past the defined space 6, which results in the rotor 2 beginning movement again through the magnetic field created by the magnets 5. Of course, movement of the rotor 2 causes the rotor shaft 8 to turn, thereby generating and delivering energy to a device, such as a direct drive assembly. The movement of the rotor 2 and the resultant generation of energy will continue until the device 7 is deactivated.

As shown in FIG. 1, a cover plate 9 can be used if desired. The power to allow the electromagnet 7 to create its magnetic field can be supplied through inlets 10 which, for example, could contain wires connected to a power source such as a low voltage battery or an internal capacitor charged from the energy output of the apparatus 1. A single magnet 3 could be used instead of the two magnets 3, and a single, shaped magnet 5 could be used in place of the series of magnets 5. Additionally, if a series of magnets is used, there can be more or less than shown in FIG. 1.

Figure 2:
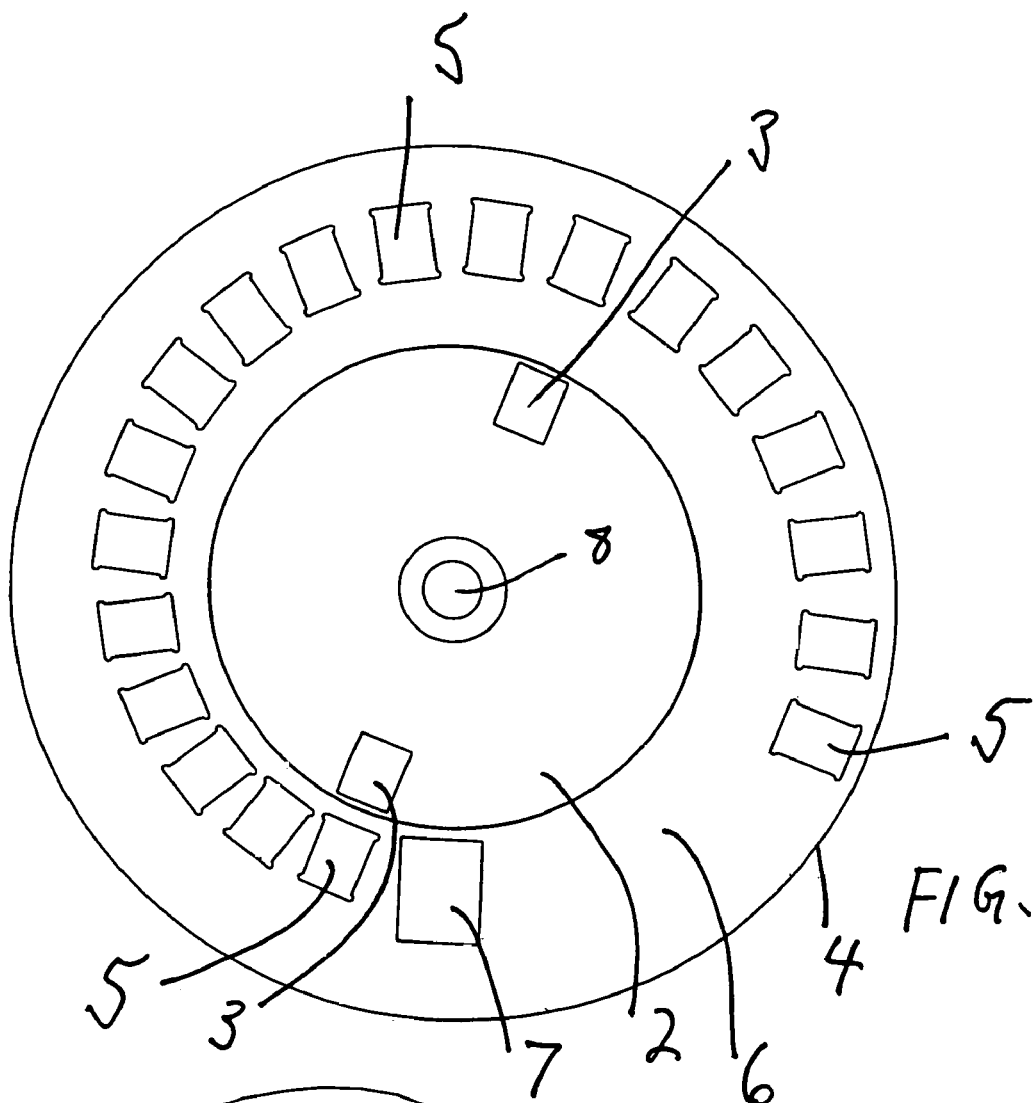
FIG. 2 is a top view of the apparatus of this invention.

FIG. 2 shows the plate 4, the defined space 6 and the electromagnet 7. With reference to FIG. 2, the rotor 2 is shown with magnets 3 and rotor shaft 8. The positioning and polarity of the magnets 3 and 5 are as described for FIG. 1.

Figure 3:
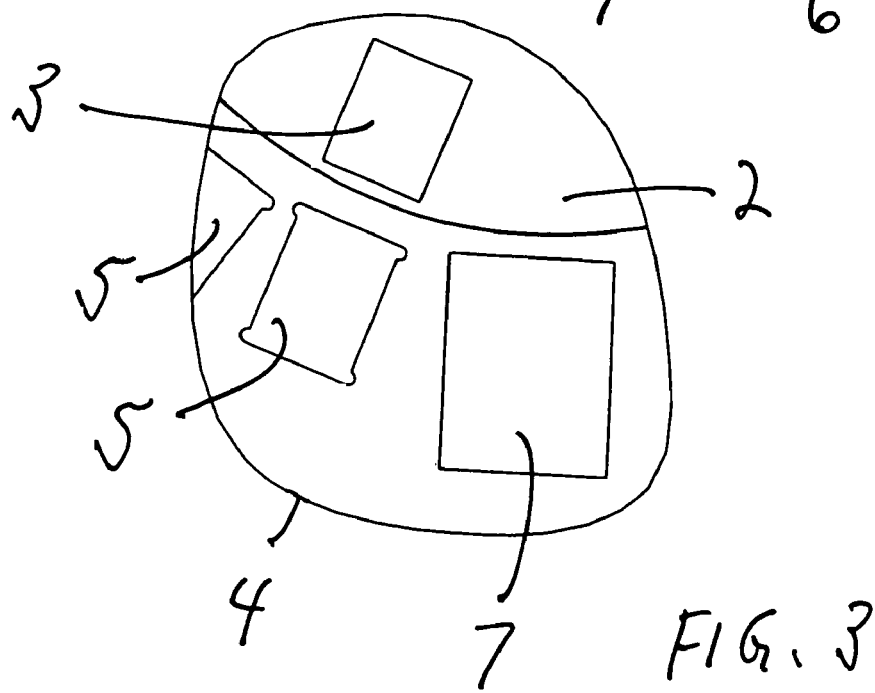
FIG. 3 is a view of the portion of FIG. 2 shown in a dotted circle.

With reference to FIG. 3, the area encircled in FIG. 1 is shown, specifically the magnet 3 located on the rotor 2, the magnets 5 located on the plate 4 and the electromagnet 7 for continuing movement of the rotor 2 to generate energy.

In the drawings, the magnets 3 are shown on the upper side of rotor 2. However, these magnets (or a single magnet in another embodiment) can be located anywhere on the rotor, such as the lower side or outer edge. The drawings also show the plate 4 as circular, but other shapes can also be used, such as square, rectangular, etc.

The electromagnet 7, which could be comprised of lead or any substance and an induction coil, is positioned adjacent to the innermost magnet 5. The electromagnet is powered through a power source sufficient to generate a magnetic field which offsets or breaks the magnetic field created by the magnets 5. An electrical impulse is fired from the electromagnet on command through a timer (such as a laser triggered circuit or other mechanical trigger mechanism) that is connected to the device and positioned between the innermost and outermost magnets 5. The timer detects the approaching magnet 3 and signals the electromagnet 7 to fire, in order to break the magnetic field as the rotor 2 approaches the innermost magnet 5, thereby allowing the rotor to continue movement around to the outermost magnet 5 again. This process is repeated upon each rotation of the rotor. The only external energy input is a requirement to charge the electromagnetic device and power the timer, if necessary. The timer could also be triggered through optical or mechanical mechanisms.

This invention has been described in detail with particular reference to certain embodiments, but variations and modifications can be made without departing from the spirit and scope of the invention as defined in the following claims.

What is claimed is:

1. A process for converting magnetic energy into mechanical force, kinetic energy or electrical energy, wherein the process comprises the steps of:

A. creating a magnetic field of increasing magnetic field strength by affixing one or more magnets to a plate having an inner circumference on which the one or more magnets are located at a generally increasing distance from the inner circumference of the plate when viewed in a clockwise direction;

B. providing for the magnetic field to be continuous except for a defined space of at least 1°;

C. moving a rotor in a clockwise or counterclockwise direction, wherein at least one magnet is affixed to the rotor;

D. locating the plate adjacent to but spaced apart from the rotor;

E. affixing the one or more magnets to and around an upper side of the plate;

F. providing the one or more magnets with a polarity which is opposite to the polarity of the magnet affixed to the rotor; and G. providing an electromagnet capable of delivering a magnetic field and locating the electromagnet adjacent to but not within the defined space, the electromagnet being in sequence with movement of the magnet affixed to the rotor;

whereby the rotor is moved through the magnetic field in a generally circular direction to turn a shaft attached to the rotor.

2. A process as defined by claim 1 wherein magnetic energy is converted into mechanical force or kinetic energy.

3. A process as defined by claim 1 wherein magnetic energy is converted into electrical energy.

* * * * *